United States Patent [19]

Glover

[11] Patent Number: 4,711,473
[45] Date of Patent: Dec. 8, 1987

[54] COUPLING PIPES

[75] Inventor: John B. Glover, Huddersfield, Great Britain

[73] Assignee: The Hepworth Iron Company Ltd., Stocksbridge, England

[21] Appl. No.: 912,822

[22] Filed: Sep. 29, 1986

[30] Foreign Application Priority Data

Sep. 30, 1985 [GB] United Kingdom ............ 8524006

[51] Int. Cl.⁴ ............................................. F16L 21/00
[52] U.S. Cl. .................................. 285/235; 285/230; 285/231; 285/237; 285/381
[58] Field of Search ............... 285/235, 381, 230, 231, 285/237

[56] References Cited

U.S. PATENT DOCUMENTS 3,848,904 11/1974 Anderson ..................... 285/381 X

FOREIGN PATENT DOCUMENTS

| 428807 | 10/1972 | Australia . |
| 365759 | 4/1982 | Austria . |
| 2292918 | 11/1974 | France . |
| 230056 | 11/1984 | German Democratic Rep. . |
| 971124 | 9/1964 | United Kingdom . |
| 1116879 | 6/1968 | United Kingdom . |
| 1152740 | 5/1969 | United Kingdom . |
| 1244948 | 9/1971 | United Kingdom . |
| 1488393 | 10/1971 | United Kingdom . |
| 1394219 | 5/1975 | United Kingdom ............ 285/381 |
| 1571627 | 7/1980 | United Kingdom . |
| 2039654 | 5/1983 | United Kingdom . |
| 2076489 | 5/1984 | United Kingdom . |

Primary Examiner—Richard J. Scanlan, Jr.
Attorney, Agent, or Firm—Holman & Stern

[57] ABSTRACT

A clay or similar pipe has a coupling socket at one end formed by a shrink-fitted plastics sleeve. A sealing ring or band is interposed between the sleeve and the pipe surface. External compression is applied to the plastics sleeve over the sealing member during shrinkage of the sleeve. This compresses the sealing member and ensures reliable sealing without requiring the use of an additional bonding or sealing composition.

Alternatively or additionally, a shrink-fitted plastics socket on a claywear or similar pipe end may have a region spaced from the pipe end, provided with a seal ring, and not subjected to shrink-fitting. The seal ring provides a secondary seal.

14 Claims, 6 Drawing Figures

COUPLING PIPES

This invention relates to the coupling together of pipes such as are used for sewers, drains, or conduits, of the kind in which a spigot end of one pipe length is inserted into a socket at the end of another pipe length.

The invention is particularly applicable to pipes of glazed or unglazed vitrified clayware, asbestos compositions, and other mineral materials.

The pipe jointing system in which each pipe length has a spigot at one end and an integral bell at the other end, has now been largely superseded by jointing means of plastics material. Plastics jointing means may for example comprise pipe coupling sleeves of plastics material provided with rubber or similar sealing rings at both ends, for receiving the ends of respective plane pipe lengths. Alterntively, pipe lengths may be fitted with plastics sleeves which project to form sockets for receiving spigot pipe ends. Pipe joints of the latter kind are disclosed for example in our British Patent Specifications Nos. 971,124, 1,152,740, and in 1,417,371.

According to one aspect of the present invention, a pipe length has a spigoted end, and a socketed end, and the socketed end comprises a sleeve of flexible resilient thermoplastics material protruding beyond the pipe end for receiving a spigoted end of a similar pipe length, a resilient sealing ring or band is provided on the external circumference of the end of the pipe length between the pipe length and the plastics sleeve, the plastics sleeve having been shrink-fitted over the pipe end and the said ring or band under radial or hoop stress whereby the said ring or band is maintained under compression. Preferably, the regions of the plastics sleeve which are not in contact with the ring or band, are shrink-fitted into intimate contact with the surface of the pipe length.

The plastics sleeve is fitted for example by heating an injection-moulded or extruded sleeve of thermoplastics material, forcibly expanding the heated sleeve before or during mounting of the sleeve on the pipe end, fitting the expanded sleeve over the pipe end and the said ring or band, and subjecting the hot sleeve to radial or hoop compression at least in the region of the said ring or band as the hot sleeve cools and shrinks.

UK Patent Specification No. 1,417,371 discloses a pipe jointing system, in which one end of a pipe length is provided with an external sealing band which may be a sealing ring, or a moulded-on collar of plastics material. The other pipe end has a plastics socket fitted on by being forcibly expanded and then allowed to shrink onto the outside circumferential surface of the pipe, with a polymeric adhesive or sealant between the pipe surface and the plastics sleeve.

The use of a polymeric sealant substantially increases the cost and difficulty of production.

UK Patent Specification No. 971,124 discloses a pipe jointing system, in which a pipe length has an external rib or sealing ring at one end, and a plastics socket at the other end, attached in a similar manner, however a polymer bonding agent or sealant is not used, but a resilient sealing ring may be fitted on the pipe end to be trapped by the shrunk-on plastics sleeve. This is not a practical arrangement, because in practice, the shrinking plastics sleeve does not exert significant pressure on the sealing ring and therefore does not compress it, so that the sealing ring does not significantly enhance sealing between the plastics sleeve and the pipe surface, on the contrary by holding the plastics sleeve away from the pipe surface it may impair sealing.

The present invention overcomes the disadvantages of previously proposed processes and provides a simple method of securing a plastics sleeve on a pipe end with an excellent seal, by shrinkage fitting. By applying pressure to the hot plastics sleeve, and through it, to a resilient sealing ring or band trapped between it and the pipe surface, the sealing ring or band is pre-compressed to a substantial extent while the plastics sleeve is enabled to shrink into intimate contact with the pipe surface and with the sealing ring or band while the latter is compressed. When the plastics sleeve has cooled and set, the externally applied compression is removed, and the stress in the sealing ring or band provides excellent sealing between the plastics socket and the pipe surface. The need for a polymer bonding agent or sealant is eliminated.

Before assembly, the sealing ring or band is fitted either to the circumference of the pipe, or to the plastics sleeve. In the latter case, the sleeve and sealing ring must be initially slightly under-sized relative to the external circumference of the pipe. In the former case, the sealing ring or band can be fitted on the plain external surface of the pipe end, or can be located in a circumferential groove in the pipe surface. A locating groove will usually be desirable, when an O-ring is used.

According to another aspect of the present invention, a pipe length is fitted with a plastics socket at an end of the pipe length, by heating, expanding and shrink-fitting a thermoplastic sleeve onto the end of the pipe length, and the plastics sleeve is provided with a resilient annular sealing element for engaging the external circumferential surface of the pipe length, in a region of the plastics sleeve that is not heated, expanded and shrunk onto the pipe length but instead is dimensional to fit on the pipe length.

In this case, a polymer bonding agent or sealant may additionally be provided between the shrink-fitted region of the plastics sleeve, and the external surface of the pipe length, or a resilient sealing ring or band may be provided between the external surface of the pipe length and the internal surface of the plastics sleeve where the latter is shrink-fitted, being subject to externally applied compression as described above. The resilient sealing element provided in a region of the sleeve that is not shrink-fitted, provides a back up seal relative to the region that is shrink-fitted.

The portion of the sleeve that projects from the end of the pipe length to form a socket, may be provided with a resilient annular sealing element to seal on the spigot end of an inserted pipe length. Alternatively or in addition, the other end of each pipe length (not provided with a socket) may have an external peripheral rib, sealing ring or band (resilient or stiff) to make sealing engagement with the internal surface of the plastics socket of an adjacent pipe length.

The plastics socket elements may for example be made of moulded or extruded polyolefine, including reinforced grades e.g. polyethylene, polypropylene, or polyvinyl chloride of suitable grade, or other thermoplastic material which has a "thermal memory" so as to shrink on cooling, and which has suitable mechanical properties and chemical inertness, for use in the required environment, for example as underground drains.

According to another aspect of the present invention, a prefabricated plastics sleeve, to form a socket, is fitted to a pipe end by heating and expanding the sleeve and fitting it on the pipe end, then allowing it to cool and contract onto the pipe end, a bonding and/or sealing agent being provided between the external surface of the pipe and the internal surface of the sleeve, and the hot sleeve being subjected to radial or hoop compression at least in the region of the said agent, as the hot sleeve cools and shrinks.

The compressible sealing band or ring, if provided, can be of any suitable elastomer (thermoplastic or thermosetting), with adequate mechanical properties, resistance to compression set, and chemical inertness. Typically the sealine ring or band, to be compressed between the shrink-fitted plastics socket and the pipe surface should be relatively soft, for example 35–60 Shore. It may for example comprise a relatively soft O-ring seated in a groove in the circumferential surface of the pipe length, or a band of material such as that used for tire inner tubes.

The invention will be further described with reference to the accompanying drawings, which respectively show, in fragmentary axial cross-section, respective embodiments of pipe joints according to the present invention.

Figure 1:
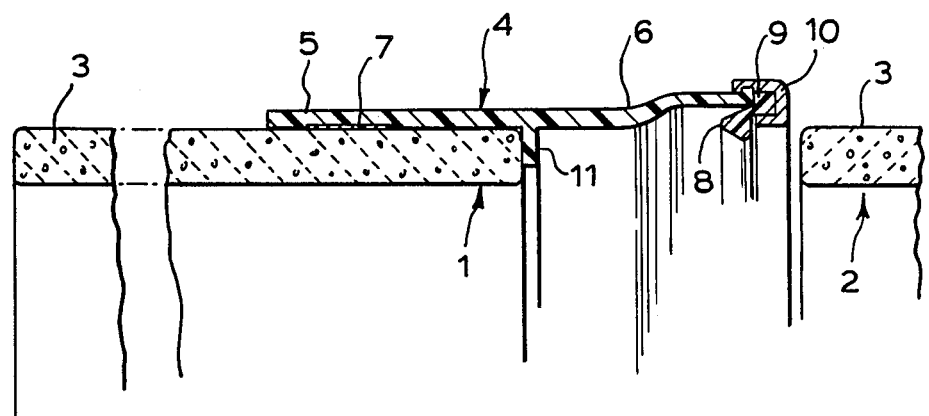
FIG. 1 shows, in axial longitudinal section, a first pipe joint embodying the invention.

FIG. 1 shows first and second pipe ends of fired clay pipes 1, 2. Each pipe has a plain spigoted end 3. At the other end, each pipe has a sleeve 4 of thermoplastics material of which one portion 5 is fastened on the external surface of the pipe, and the other portion 6 projects from the end of the pipe to form a socket which in use receives the spigot end 3 of the adjacent pipe.

The plastics sleeve is injection-moulded, with dimensions such that its internal diameter is somewhat less than the external diameter of the pipe, so that in its as-moulded state it could not be pushed onto the pipe end. It is made of a thermoplastic material which exhibits "shape memory" or "thermal memory", that is to say, when heated until it is soft it can be deformed, in particular by being expanded, and when it subsequently cools it shrinks back to its initial dimensions. To fit the plastics sleeve on the pipe end, the region 5 of the sleeve that is to fit over the pipe end is heated to a temperature below that at which its plastic material is degraded, causing the sleeve to expand to an internal diameter greater than the external diameter of the pipe end. The heated and softened plastics sleeve may be forcibly expanded while it is hot and soft, by the act of pushing it over the pipe end, or by means of an expansion mandrel. The sleeve preferably has a register rib or register lugs 11 to locate it relative to the end of the pipe 1. The presence of the register rib or lugs is believed to contribute to maintaining the shape and dimensions of the socket region 6 while the opposite region 5 of the sleeve expands and shrinks. The region 5 can be heated in any convenient way for example by hot water, steam, hot air, radiant heat, but is preferably heated by being dipped in a fluidised bed of hot sand as this has been found to provide very uniform and controllable heating. After the region 5 of the plastics sleeve has been fitted over the pipe end in this way, it is allowed to cool, whereupon it shrinks onto the external surface of the pipe, and conforms to any irregularities in the surface of the pipe end by localised deformation of the inner surface of the sleeve.

Sealing between the inner surface of the socket and the outer surface of the pipe, depends on the accuracy with which the plastics material can conform to the pipe surface, and in practice, simple shrink-fitting does not provide a reliable seal.

To provide a seal, the pipe has an annular band 7 of relatively soft elastomer fitted onto its external surface, at a position spaced from the pipe end and fairly close to the end of the region 5 of the plastics sleeve. After the hot plastics sleeve has been fitted over the pipe end and over the sealing band 7, compression dies (which may be rigid, flexible, or inflatable by internal pressure) are applied to the external surface of the region 5 of the plastics sleeve at least in the area radially in line with the sealing band 7, and pressure is thereby applied to the plastics sleeve. Even whilst soft, the material of the plastics sleeve remains capable of transmitting compression from the dies to the sealing band 7, so that the latter is compressed with a force substantially greater than that which can be exerted by simple thermal shrinkage of the plastics material of the sleeve. The material of the sealing ring is thereby pre-stressed so that, after the plastics sleeve has cooled and set in position, and the pressure dies have been removed, a very substantial radial pressure exists between the sealing ring, the pipe, and the internal surface of the plastics sleeve, providing a reliable seal.

To form a seal between the inserted spigot end 3 and the socket 6, the spigot end may have an external sealing ring or band to engage the internal surface of the plastics socket, for example as described in Nos. 1,417,371 or 971,124. Alternatively or additionally, the socket may be fitted with a sealing ring of resilient material, in any convenient way. For example the sealing ring may be secured in the end of the socket by adhesive, by solvent welding, by direct bonding, or mechanically. In the case of a sealing ring bonded directly to the plastics socket, for example by a thermal bond, or by having the sealing ring and plastics socket injection moulded one in contact with the other, it may be necessary to ensure that the socket region of the thermoplastic sleeve is not subjected to the heating, expansion and shrinking process needed to fit the other region 5 onto the pipe end.

In the illustrated embodiment, the socket has a sealing ring 8 with a flange 9 held in position by a locking ring 10 snap-fitted on the end of the socket, in a manner analogous to the well known Hepsleve pipe coupling.

The use of a pre-stressed sealing ring between the pipe end and the shrunk-on plastics sleeve, substantially eliminates any need for a bonding or sealing composition between the pipe and plastics sleeve, however such a material may be provided if desired, for example in the manner described in No. 1,417,371.

Figure 2:
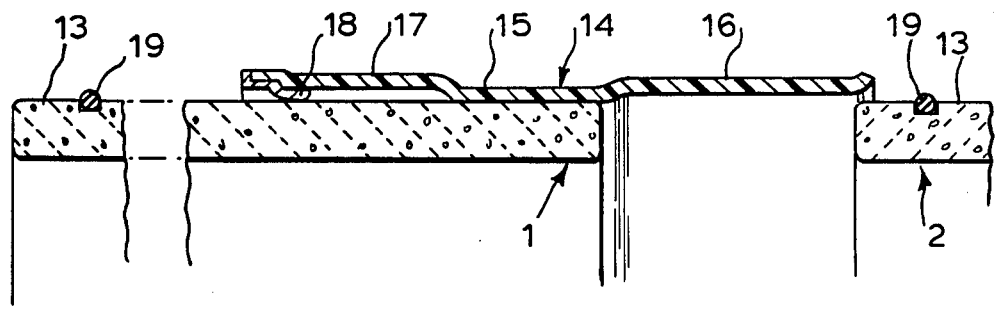
FIG. 2 is a similar longitudinal section showing a second embodiment of the invention.

FIG. 2 illustrates another embodiment of the invention. A plastics sleeve 14 is shrink-fitted on one end of a clay pipe 1 to form a projecting socket 16. In this embodiment, the region 15 of the plastics sleeve that is shrink-fitted on the pipe 1, is an intermediate region. The sleeve end region 17 opposite the socket region 16 has a greater internal diameter than the external diameter of the pipe, and is provided with a sealing ring 18 at its end. The sealing ring 18 is attached to the sleeve region 17 in any convenient way, for example in any of the ways mentioned with reference to the sealing ring of the socket described with reference to FIG. 1.

The sleeve region 17 is initially moulded over-sized relative to the external surface of the pipe length whereas the intermediate region 15 is initially undersized relative to the external surface of the pipe length. The sealing ring 18 is designed to form a compression seal between the internal surface of the sleeve region 17, and the external surface of the pipe, when the plastics sleeve 14 is fitted over the pipe end.

To fit the plastics sleeve 14 on the pipe end, the intermediate region 15 and optionally the socket region 16 are heated to a temperature below the degradation temperature of the plastics material of the sleeve, at least the region 15 is expanded and fitted over the pipe end, and the sleeve is allowed to cool so that the region 15 shrinks into intimate contact with the external surface of the pipe end. A bonding or sealing agent may be provided between the region 15 of the sleeve, and the external surface of the pipe. The shrink-fitted region 15 provides a primary seal between the socket and the pipe. The sealing ring 18 provides a secondary or back up seal.

The socket region 16 can seal against the inserted spigot pipe end 13 in any convenient way for example any of the ways mentioned above with reference to FIG. 1. In the illustrated embodiment, an elastomeric O-ring 19 is seated in a circumferential groove in the external surface of the spigot end 13, to seal against the internal surface of the socket 16.

Figure 3:
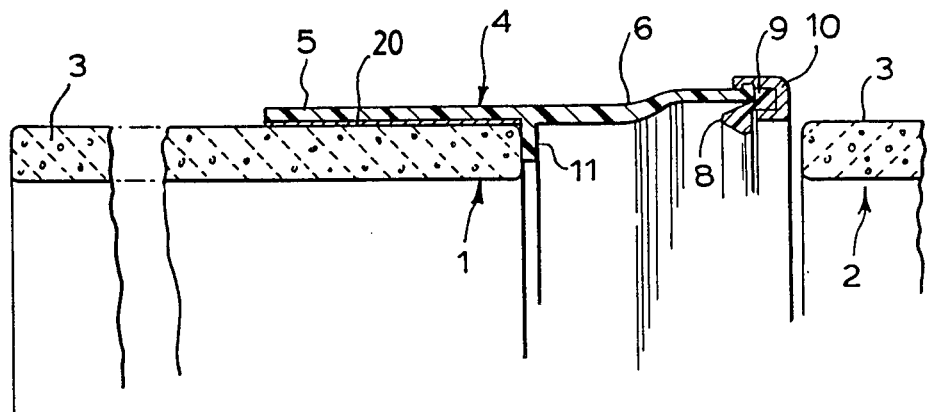
FIG. 3 is a longitudinal section of a third embodiment of the invention.

FIG. 3 illustrates a further embodiment of the invention. In this, as in FIG. 1, a plastics sleeve 4 is heated, fitted over the pipe and 1, and allowed to cool and shrink onto the pipe end. In this embodiment, a layer of a polymer bonding and/or sealing composition 20 is provided between the external surface of the pipe and the internal surface of the plastics sleeve, suitable materials being disclosed for example in GB No. 1417371, U.S. Pat. No. 3,848,904. To enhance the sealing and bonding, the region 5 of the sleeve that overlies the pipe end and the bonding or sealing composition 20, is subjected to an externally applied inwards compression force as the sleeve cools and shrinks onto the pipe end.

Figure 4:
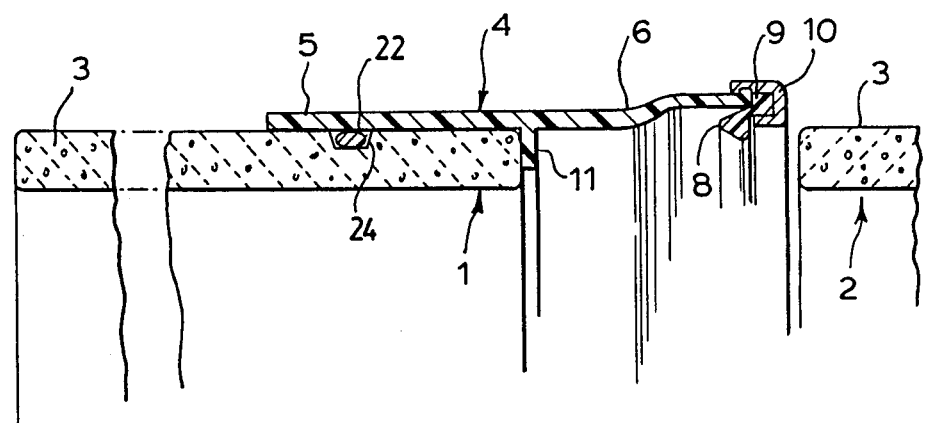
FIG. 4 shows a modification of the joint of FIG. 1.

FIG. 4 shows a modification of the joint shown in FIG. 1. In this case, the sealing band 7 is replaced by an O-ring seal 22 located in a circumferential groove 24 in the external surface of the pipe length. The external compression applied to the plastics sleeve 4 during the shrink-fitting thereof compresses and flattens the O-ring in the groove.

Figure 5:
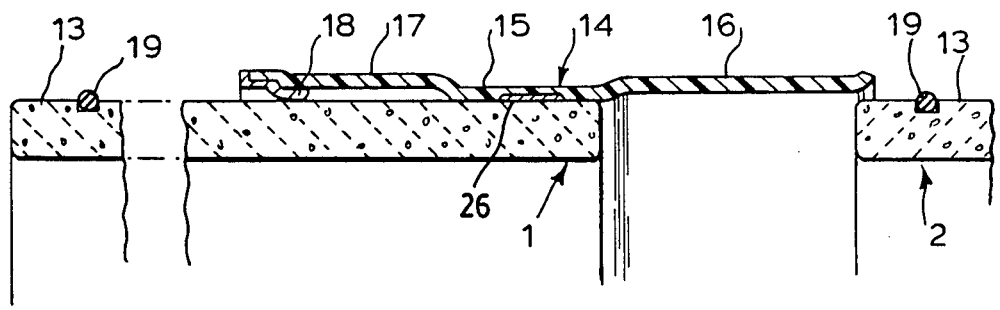
FIG. 5 shows a modification of the joint of FIG. 2.

FIG. 5 shows a modification of the joint shown in FIG. 2 in which the shrink-fitted intermediate region 15 of the plastics sleeve overlies and traps a resilient sealing band 26 analogous to the sealing band 7 in FIG. 1. In this embodiment, the intermediate region is subjected to externally applied compression during the shrink-fitting step, and this compression pre-compresses the sealing band 26, thereby enhancing the sealing effect of the band and ensuring intimate contact between the shrink-fitted region adjacent the band, and the external surface of the pipe.

Figure 6:
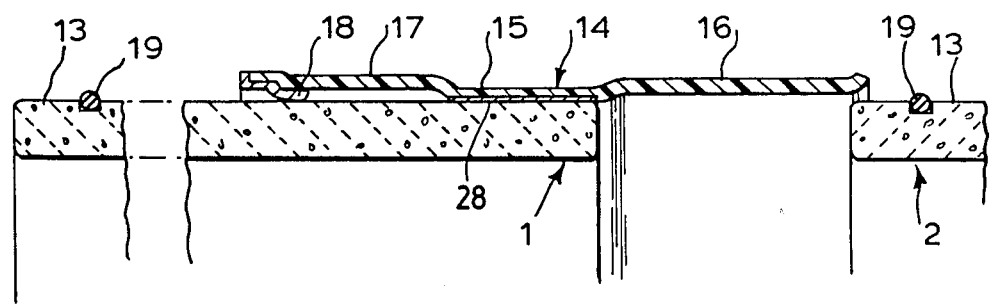
FIG. 6 shows a further modification of the joint of FIG. 2.

As already mentioned, in the joint of FIG. 2, a bonding or sealing agent may be provided between the region 15 of the sleeve, and the pipe surface. FIG. 6 illustrates such a joint, in which a layer of bonding or sealing composition 28 is provided between the shrink-fitted sleeve region 15, and the pipe surface. In this embodiment, the shrink-fitted region 15 of the sleeve may be additionally subjected to externally applied inwards compression.

The illustrated pipe joints have plastics coupling sleeves onto the external surfaces of pipe lengths of uniform external diameter. This construction is suitable for conventional pipe laying in trenches. Pipes are however also laid by direct insertion in the ground, the pipe lengths being pulled or pushed into the ground (for example by a mole plough or a pipe jacking technique). For such techniques, the pipe joints should have external diameters not greater than the external diameter of the pipes themselves. Accordingly, the pipes may be provided with rebates at their ends to receive the plastics sleeves so that these are flush with, or inset relative to, the external surfaces of the pipes. In this case, the plastics sleeve will usually be a simple tube of constant internal and external diameter, for example a length cut from an extruded plastics pipe.

I claim:

1. A socket-ended pipe comprising a pipe length, a sleeve of flexible resilient shrinkable thermoplastics material partly embracing and partly protruding beyond an end of the pipe length, for receiving a spigot end of a further pipe length, and a resilient annular sealing member on the external circumference of the said socketed end, trapped between the external surface of the pipe length and the internal surface of the plastics sleeve, the plastics sleeve having been shrink-fitted over the said pipe end and sealing member under externally applied compressive stress whereby the said sealing member is maintained under compression.

2. A socket-ended pipe as claimed in claim 1 in which the regions of the sleeve which are not in contact with the sealing member, have been shrink-fitted into intimate contact with the external surface of the pipe length.

3. A socket-ended pipe as claimed in claim 1 in which the sealing member is a flat band.

4. A socket-ended pipe as claimed in claim 1, in which the sealing member is an O-ring.

5. A socket-ended pipe as claimed in claim 4 in which the sealing ring is located in a circumferential groove in the external surface of the pipe length.

6. A method of providing a socket on an end of a pipe length, for receiving a spigot end of a further pipe length, comprising providing a sleeve of flexible resilient shrinkable thermoplastics material, heating the sleeve, expanding at least one end portion of the sleeve, fitting the expanded sleeve end portion over the end of the pipe length, disposing an annular sealing member between the external surface of the pipe length and the internal surface of the sleeve applying to the heated sleeve to an external inward compression force at least in the region of the said sealing member, and allowing the sleeve to cool and shrink onto the pipe length end and the sealing member while subjected to the said compression, and removing the said compression.

7. The method claimed in claim 6, comprising forcibly expanding the heated sleeve before or during fitting of the sleeve onto the end of the pipe length.

8. A socket-ended pipe comprising a pipe length, and a thermoplastics sleeve, having a first portion projecting from an end of the pipe length to form a socket, an intermediate portion shrink-fitted on the end of the pipe length to secure the sleeve, and a further portion encircling the pipe length but not shrink-fitted thereon, and a resilient annular sealing element provided on the last-mentioned region of the sleeve for engaging and sealing against the external circumferential surface of the pipe length.

9. A socket-ended pipe as claimed in claim 8, having a polymer material between the shrink-fitted region of the sleeve, and the external surface of the pipe length.

10. A socket-ended pipe as claimed in claim 8 further comprising a resilient annular sealing member provided between the external surface of the pipe length and the internal surface of the sleeve in the shrink-fitted region of the latter, this region having been shrink-fitted while subjected to externally applied compression.

11. A method of making a socket-ended pipe, comprising providing a pipe length, providing a sleeve of shrinkable thermoplastic material having a first end region provided with a resilient annular sealing element and dimensioned to fit on an end of the pipe length, a socket-forming second end region, and an intermediate region, fitting the first end region and the intermediate region of the sleeve onto an end of the pipe length, and shrink-fitting only the said intermediate region of the sleeve into firm engagement with the external surface of the pipe length.

12. The method according to claim 11 further comprising providing a resilient annular sealing member between the said intermediate region and the external surface of the pipe length, and applying compression to the intermediate region during the shrink-fitting thereof and thereby to the said sealing member.

13. The method of claim 11 further comprising providing a polymer bonding agent or sealant between the said intermediate region and the external surface of the pipe length.

14. A method of making a socket-ended pipe comprising providing a pipe length, providing a pre-fabricated shrinkable plastics sleeve, heating and expanding the sleeve and fitting it on an end of the pipe length, with a portion projecting from the pipe length end to form a coupling socket for receiving a spigot end of a further pipe, allowing it to cool and contract onto the pipe length, providing a bonding and/or sealing agent between the external surface of the pipe length and the internal surface of the sleeve, and applying to the heated sleeve to an external inwards compression force at least in the region of the said agent as the sleeve cools and shrinks onto the pipe length.

* * * * *